United States Patent [19]

Velagaleti et al.

[11] Patent Number: 4,903,432

[45] Date of Patent: Feb. 27, 1990

[54] AUTOCLAVABLE, REUSABLE, STERILE PLANT GROWTH SYSTEM AND METHOD

[75] Inventors: Ranga R. Velagaleti, Worthington; Sarah Marsh, Springfield; Randall Velliquette, Xenia, all of Ohio

[73] Assignee: Battelle Memorial Institute, Columbus, Ohio

[21] Appl. No.: 136,205

[22] Filed: Dec. 21, 1987

[51] Int. Cl.$^4$ ............................................ A01G 25/00
[52] U.S. Cl. ............................................ 47/81; 47/80
[58] Field of Search ........................... 47/81, 79, 80, 84

[56] References Cited

U.S. PATENT DOCUMENTS

| 165,000 | 6/1875 | Johnson | 47/81 |
|---|---|---|---|
| 1,264,096 | 4/1918 | Lelievre | 47/81 |
| 1,342,786 | 6/1920 | White | 47/81 |
| 4,299,054 | 11/1981 | Ware | 47/81 |
| 4,369,598 | 1/1983 | Beckwith | 47/81 |
| 4,531,324 | 7/1985 | Yang et al. | 47/81 |

FOREIGN PATENT DOCUMENTS

| 233181 | 1/1960 | Australia | 47/81 |
|---|---|---|---|
| 2735586 | 2/1979 | Fed. Rep. of Germany | 47/81 |
| 4625682 | 7/1971 | Japan | 47/1.1 |
| 2011030 | 1/1987 | Japan | 47/1.1 |
| 1400450 | 7/1975 | United Kingdom | 47/81 |
| 2028081 | 3/1980 | United Kingdom | 47/1.1 |

Primary Examiner—Harold J. Tudor
Assistant Examiner—Richard W. Wendtland
Attorney, Agent, or Firm—Watkins, Dunbar & Pollick

[57] ABSTRACT

A sterile plant growth system and a method of use including an upper plant growth container and a lower reservoir container and fluid communication through a wick from the reservoir to a plant growth medium in the plant growth container. The system is sealable and autoclavable, unbreakable, and reusable to provide sterile growing conditions.

5 Claims, 1 Drawing Sheet

AUTOCLAVABLE, REUSABLE, STERILE PLANT GROWTH SYSTEM AND METHOD

TECHNICAL FIELD

This invention relates to plant growth apparatus and methods for the production of uncontaminated generally sterile growing plants by artificial culturing and growing conditions. Such systems and methods are operated in containers especially constructed for this purpose.

BACKGROUND OF THE INVENTION

Sterile, reusable plant growth assemblies are needed to study the specific effects of biological or chemical agents, without interference from extraneous contaminants, during prolonged growth periods. Currently, reusable systems are not commercially available for growing plants under sterile conditions with the growing medium partitioned from a nutrient solution.

One currently used system of sterile plant growth apparatus and method is commonly referred to as the "glass bottle-jar assembly" Glass "Leonard" jars (Leonard, in 1944; and Vincent, in 1970), referring to a certain particular kind of jar, have been used for sterile growth purposes in several laboratories. Leonard jars have consisted generally of used beer bottles with the bottoms removed that have been inverted and filled with soil or any other plant growth medium, which is held in place by a cotton plug in the narrow mouth of the bottle. The narrow mouth of the bottle is inserted into a glass jar containing nutrient solution. A cotton wick, which penetrates and is held in place by the cotton plug and penetrates into the glass jar, facilitates the uptake of nutrient solution from the glass jar to the plant growth medium in the bottle.

The glass bottle-jar assembly has several disadvantages which include the following: (1) Because they are glass, they tend to crack and break during autoclaving, washing, and general handling especially when accidentally hit with another object or dropped. (2) The cut end of the beer bottle tends to be a very sharp edge, and unless etched well, often is unsafe in routine handling. (3) The bottle does not fit very well in the mouth of the jar, causing slippage and rocking of the assembly. (4) The roots of the plants grow down into the jar through the cotton plug in the mouth of the bottle, into the jar resulting in a non-uniform absorption of nutrients as well as eventual decay of the submerged roots. (5) Replacement of the nutrient solution requires opening the jar frequently, resulting in an increased chance of contamination of the nutrient solution, the roots, and the plants.

While it is important to provide systems for growing of plant seedlings under sterile conditions, when the objective of a study requires sterile growing conditions, it is also important to provide systems which are relatively simple in order to maintain plant growth with minimal attention. It is also desirable to keep the unit cost at a minimum, since most laboratories will use a large number of assemblies in their research programs.

It is well known that most plants grow best when supplied with the proper amount of moisture to their root system at a constant rate. Watering of a large number of plants, as in a laboratory, a plant store or a large office building, can be a burdensome chore. The task is further complicated because not all plants require the same amount of water during a given period of time. Some types of plants require daily watering. However, it is not always possible to water plants on a daily basis, for example on such occasions as when a person is on vacation, or when a laboratory, store, or office building is closed for the weekend or a holiday. Such neglect is often harmful to plants.

To this end, self-watering planters have been developed which include a shallow dish or water reservoir and a separate plant container or pot resting on a support elevated above the level of water in the water reservoir. A wick or other means of absorption has one end disposed through an opening formed in the lower portion of the plant container and the other end immersed in the water contained in the reservoir. The water is drawn up through the wick and into the growing medium of the pot through capillary action.

Misadventures in growing young plants are well known. These include: irregular moistening of the mass of growing medium, producing a deterioration of the roots; moistening is often excessive and causes the roots to rot when the lower part of the mass of the growing medium is bathing in the drainage water contained in the reservoir; moistening is frequently insufficient which causes the roots to wither when the reservoir evaporates too quickly. It has therefore been a sought-after objective to create and provide a better plant growing assembly, system, and method. Prior inventions include the following:

U.S. Pat. No. 4,463,522 Lindemann teaches a system and apparatus for growth of plants from sterile plant particles. An aluminum tray contains a sterilizable plant growth medium. The tray is placed in a polypropylene bag and the unit is sterilized in an autoclave. Subsequently, the tray is inoculated with a suspension of sterile plant particles. A membrane serves as a closure prevention means during autoclaving and also as a wick after closure of the bag, with one end in the plant growth medium and the other end in the bag under the tray so as to absorb any moisture collected at the bottom of the bag and return it to the growth medium.

U.S. Pat. No. 4,324,070 Swisher teaches another planter that comprises a water reservoir, lid and plant container that could be made of molded plastic, and although shown generally circular, could be any shape. The lid contains an opening for an absorbent wick.

U.S. Pat. No. 4,224,765 Song teaches a plant culture container. The individual components of the container are best seen in FIG. 4 of the patent, and consist of a base member, a top or cover, a partitioning member, a filter for the vent opening and a cover for the vent. The partition member includes a longitudinal partition wall and a plurality of transverse partition walls; compartments are defined by these walls. With the cover removed, the compartments are filled with a growth medium such as agar, water, hormone and plant food. A plant is put into the medium in each compartment and the cover placed on. The container is made of polypropylene plastic, and it is stated that the growth takes place under aseptic conditions and that the members of the container are readily cleaned and sterilized for reuse.

U.S. Pat. No. 4,121,525 Courtis teaches a method of aseptically sowing small seeds in a sterile flask with a growth medium and closed by a puncturable resealing membrane as a closure. Seeds are sterilized and passed through the membrane by a hypodermic syringe.

U.S. Pat. No. 4,027,427 Si. ller et al. teaches a sterilizable plastic bag for growing mushroom spawn. The bag contains a suitable substrate and is sterilizable. A collar is threaded with a lid. the lid has an in turned lip that mates with the rim of the collar. A filter is held between the rim and the lip. This whole closure is reusable. The bag can be made of polyethylene, nylon or polypropylene.

U.S. Pat. No. 3,958,366 Meyers teaches a flower pot manufactured from a variety of materials including polyethylene or polystyrene as the preferred materials. There is a bottom container for holding water and an upper container for potting soil. The containers are fitted so as to be detachable. There are a plurality of wick tubes extending into the bottom container which are open at the bottom and contain wicks that extend into the top container.

U.S. Pat. No. 3,676,953 Delogne teaches a plant box of porous material such as asbestos cement. The container is filled with mould or compost and rests on a double perforated plate. The mould is humidified with wicks extending into a chamber below the perforated plates containing water. The mould is covered with a gravel layer.

U.S. Pat. No. 3,199,250 Sawyer teaches a seed growth apparatus which includes a tray structure. The tray structure is made of plastic and forms a support for a container. A shoulder of the tray engages the upper rim of the container. Seeds are wetted as a result of a ring made of blotter paper and supplied with liquid from a wick. A cover is provided for the tray structure.

SUMMARY OF THE DISCLOSURE

In summary, this invention is a system for the sterile growth of plant seedlings comprising:
(a) a plant growth container having sides terminating in a lower end and a bottom portion with at least one aperture therein, containing a plant growth medium filled to within a substantially small but spaced distance from the top of the container, with a fabric-like moisture conductive wick passed into the plant growth medium through the aperture in the bottom of the container, with a quantity of a sterile aquarium gravel covering the spaced distance from the top of the plant growth medium to the top of the container, with a moisture impervious lid-like cover over the top and fastened to the sides of the container, above the sterile aquarium gravel, and with the sterile aquarium gravel in the plant growth medium in proximity to the wick and protruding through an aperture in the bottom thereof;
(b) an impermeable reservoir container having sides and a bottom with the sides substantially conforming to the sides of the plant growth container for fitting the plant growth container and the reservoir container together tightly to prevent contamination, and with a closable opening in the sides of the reservoir container which is operable to open and admit replenishing the nutrient solution; and,
(c) with the plant growth container mounted upon the top of the reservoir container, with the wick passing into the reservoir container, immersed in the solution, and with further means for fitting the cover to the sides of the plant growth container and further means for sealing the reservoir container to the plant growth container, the sealing means being autoclavable and the entire assembly being autoclavable to provide sterilized contents.

The method of the invention is a method for growing sterile plant seeds including: providing a sterile plant growth medium in an impervious container; fitting and sealing a reservoir container to the bottom of the plant growth container with the wick protruding into the reservoir container from the bottom of the plant growth container; covering the top of the plant growth container with a water impervious autoclavable foil and sterilizing the assembly at autoclaving conditions; imbedding at least one sterilized seed underneath the surface of the top of the medium at room temperature; covering the surface of the plant growth medium with a layer of sterile aquarium gravel; and covering the surface with an opaque material that prevents evaporation of water from the plant growth medium, after the shoot has emerged, wrapping the material around the bottom portion of the stem, to enable unobstructed growth of the seedlings.

The foregoing and other advantages of the invention will become apparent from the following disclosure in which a preferred embodiment of the invention is described in detail and illustrated in the accompanying drawings. It is contemplated that variations and structural features and arrangement of parts may appear to the person skilled in the art, without departing from the scope or sacrificing any of the advantages of the invention which is delineated in the included claims.

DETAILED DESCRIPTION OF A PREFERRED BEST MODE EMBODIMENT OF THE INVENTION

Figure 1:
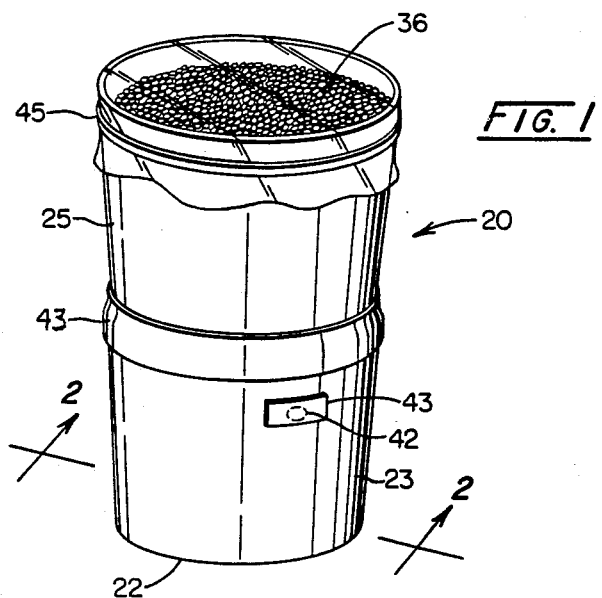
FIG. 1 is a perspective view of a plant growth system of this invention, ready to be autoclaved.
Figure 2:
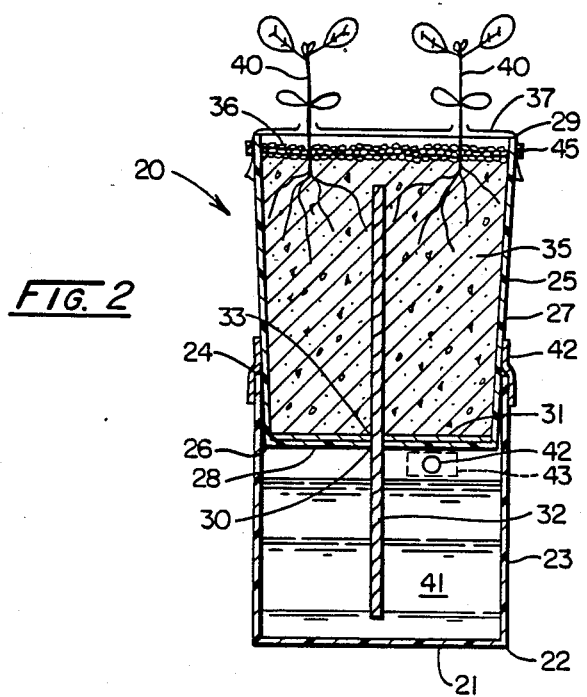
FIG. 2 is an elevational cross-section view of the central axis of the system taken along the line 2—2 of FIG. 1, with seedling plants growing.

Referring to FIGS. 1 and 2, a plant growth system 20 includes a plurality of generally cylindrical containers oriented with the principal axis substantially vertical having a bottom surface 21 which is a part of a lower reservoir container 22 having cylindrical sides 23 and an upper end 24. The reservoir container 22 is constructed of a material that may be subjected to autoclaving sterilizing conditions without deterioration when the temperature is raised to 200 to 300 degrees in a moist steam environment.

A suitable material is a semi-transparent polypropylene molded vessel.

A plant growth container 25 having a lower end 26 of slightly smaller size than the upper end 24 of the reservoir container 23 fits therein. The low end 26 of the plant growth container 25 is sized to fit within the upper end 24 of the reservoir container by a slight manual press fit.

As shown in FIG. 2, the plant growth container 25 preferably has a slight tapered wall 27 with the taper providing the means of inserting the lower end 26 in the upper end 24. The plant growth container 25 is provided with a bottom surface 28 and is open at the top 29. An aperture 30 is provided in the bottom of the plant growth container 25 through which is passed a cotton piping style wick 32 that protrudes below the bottom 28 and into the reservoir container 23 to a position substantially near the bottom 21. The bottom 28 is provided with a moisture permeable filter paper disk 31. The wick 32 passes through an aperture 33 in the filter paper 31 and continues to a position juxtaposed near the top 29 of the plant growth container 25.

Soil or other plant growth medium 35 is provided from the surface of the filter paper 31 to within a short distance from the top and slightly beyond the top of the wick 32. A moisture permeable cover medium (granulate) 36 such as aquarium gravel is provided in a thin layer over the top of the plant growth medium 35. An aluminum or other foil covering 37 is provided over the top end 29.

In use, sterile seeds 40 are planted in the plant growth medium 35 before the sterile aquarium gravel 36 is placed on the plant growth medium 35.

During the growth period, sterile nutrient solution 41 is provided in the reservoir container 23 by means of a fill hole 42. Between fillings, the fill hole 42 is closed with a covering 43 which may be autoclavable adhesive tape.

To maintain sterile conditions, a layer of the same kind of autoclave tape is applied at the closure between container 23 and container 25. The covering 37 is held in place by an elastic band 45.

The commonly used and earlier version of the Leonard bottle jar assembly has several disadvantages which are overcome in the practice of this invention. These disadvantages are described in the Background of the Invention section of this disclosure.

Because of the combination of construction features which are combined with specific assembly materials, the system of this invention has various advantages over the prior art. Some of these include:

1. It is a totally autoclavable reusable unbreakable system for growing plants. The nutrient solution, the roots, and the plant growth medium are kept free of contamination for extended periods of plant growth.
2. The components are not made of glass and therefore are very safe during washing, experimental setup, routine handling during a 6–8 week growth period, and harvesting.
3. The component parts of the system are relatively inexpensive. The reservoir container 23 and the plant growth container 25 can be readily purchased in standard sizes. The system is reusable over extended periods of time, further reducing the cost of the materials to a user laboratory. The upper container 25 and the lower container 23 will normally stay tightly closed, and with the tape 42 seal, the connection is so strong that the whole system stays in place and can be lifted and carried from the top, even when filled to capacity.
4. Root penetration from the upper container to the lower container is prevented by the filter paper 31 lining the bottom of the plant growth container 25, and by the tight fit of the cotton wick 32, the hole in the filter paper and the bottom 28 of the plant growth container 25. The filter paper also serves the purpose of nutrient solution retention and transfer to the soil medium.
5. Because when a semi-transparent material is used, the level of the nutrient solution in the reservoir container 23 can be readily monitored without opening the system.
6. The covering 37 over the top of the gravel layer prevents evaporation of excessive amounts of water from the growth medium, thus preventing salt accumulation in the soil medium during the course of the experiment.
7. Units of various sizes can be easily assembled by proper selection of containers so that growing larger plants for longer periods under sterile conditions is easily accomplished.

The following is an example of the practice of the system and method of this invention:

A 1000 cc polypropylene tri-pour beaker was assembled with a 500 cc polypropylene staccup as the reservoir container. The upper edge of the beaker was removed, resulting in a tapered cylindrical growth medium container. A small ¼ inch hole was drilled through the center of the bottom of the plant growth container. A piece of Whatman #1 filter paper, 9 centimeters in diameter, was placed in the bottom of the plant growth container to completely cover the bottom. A hole was punched in the filter paper to match the hole in the container. A cotton wick (Conso Products Company 6/32Δ cotton piping style 60004, cotton 001, 9 inches long) was pushed through the holes in the container and the filter paper. The containers were fitted together tightly forming a jammed fit which was sealed and held together with 1 inch wide autoclave tape (American Scientific Products Catalog A-9475-13). Just under the autoclave tape seal, a ⅛ inch diameter hole was drilled for replacement of the nutrient solution by gravity fill, when needed, without separating the upper and lower containers. When not in use, this hole was sealed with two layers of autoclave tape. Soil was poured into the plant growth container to just about 1 inch from the rim while holding the cotton wick upright in the center. The top of the assemblies were covered with aluminum foil which was held in place with an elastic band.

The whole assembly was autoclaved for ninety minutes at 200° to 300° steam vapor contact.

After cooling, the reservoir container was filled with sterile nutrient solution, causing the whole soil column to become wet by absorption of the nutrient solution through the cotton wick.

Surface sterilized seeds were planted one inch deep in the plant growth medium. To prevent bacterial and fungal contamination, the surface of the plant growth medium was covered with a one inch thick layer of sterile aquarium gravel. The whole assembly was covered with brown paper to prevent exposure of the soil and root system to light. After the emergence of the seedlings, the top of the assembly was covered with Handy Wrap (Dow Chemical Company) allowing enough space for the plants.

It is herein understood that although the present invention has been specifically disclosed with the preferred embodiments and examples, modifications and variation of the concepts herein disclosed may be resorted to by those skilled in the art. Such modifications and variations are considered to be within the scope of the invention and the appended claims.

We claim:

1. A method for growing sterile plant seedlings including:
   a. providing a sterile plant growth medium that can be sterilized in order to keep the contents sterile in a first plant growth container made from a moisture impermeable material;
   b. embedding a fabric like moisture transmitting wick vertically placed within the plant growth medium for uniform distribution of moisture throughout the vertical and horizontal profile of the growth medium and projecting through an aperture in the plant growth container, and through an aperture in a perforated moisture transmitting bottom overlay inside and on the bottom of the plant growth container, and into a second reservoir container below the first container for water or nutrient solution, and into the solution therein;

c. closing the plant growth container and the reservoir container with a moisture impermeable autoclavable sealing means material to provide an autoclavable assembly;

d. providing an autoclavable foil-like cover over the top and sealed to the plant growth container;

e. autoclaving the assembly under sterilizing temperature conditions;

f. opening the moisture impermeable foil-like cover material and planting the sterile seeds in the plant growth medium below the surface of the plant growth medium;

g. adding a sterile granulate material on the upper surface of the plant growth medium and h. recovering the surface of granulate material with the moisture impermeable cover, while permitting the shoots of plants to grow into the atmosphere, without obstruction, through apertures in the cover.

2. A substantially sterile system for growing plant seedlings and plants that can be repeatedly autoclaved through dry sterilization or steam sterilization comprising:

a. a plant growth container of moisture impermeable material having sides terminating at the lower end in a bottom portion having at least one aperture therein, containing:

i. a plant growth medium, in the container to within a substantially small but spaced distance from the top of the container, ii. a fabric-like moisture conductive wick passing into the plant growth medium through the aperture in the bottom of the container, iii. a moisture impermeable autoclavable foil-like cover over the top and fastened to the sides of the container.

b. a reservoir container of moisture impermeable material having sides and a bottom, with the sides tapering to fit and conform to the sides of the plant growth container near the bottom thereof and pressed therein to provide a manually operated press fit to the sides of the plant growth container, for the storage of water or plant growth nutrient solution, and iv. an opening in the sides of the reservoir container closable and sealable by an autoclavable sealing means which is operable to open and admit replenishing the water or nutrient solution; and c. with the plant growth container mounted upon the top of the reservoir container and the wick passing vertically through the growth medium and into the reservoir container immersed in the water or solution, with v. means for fitting and sealing the foil-like cover to sides of the plant growth container said sealing means and entire system being autoclavable to provide sterilized contents.

3. A system according to claim 2 wherein the plant growth container and the reservoir container are constructed of autoclavable polypropylene.

4. A system according to claim 2 wherein the wick is immersed in the plant growth medium from the bottom of the plant growth container to a position juxtaposed to the upper surface of the plant growth material near the top.

5. A system according to claim 2 wherein the moisture permeable material at the bottom of the plant growth container is perforated filter paper that can also prevent root penetration into nutrient solution.

* * * * *